(12) United States Patent
Oliver

(10) Patent No.: US 7,396,069 B2
(45) Date of Patent: Jul. 8, 2008

(54) REMOVABLE TRUCK DECK

(75) Inventor: Craig Leslie Oliver, Puslinch (CA)

(73) Assignee: On-Trux Ltd., Ayr (CA)

( * ) Notice: Subject to any disclaimer, the term of this patent is extended or adjusted under 35 U.S.C. 154(b) by 332 days.

(21) Appl. No.: 11/277,144

(22) Filed: Mar. 21, 2006

(65) Prior Publication Data
US 2007/0222259 A1    Sep. 27, 2007

(51) Int. Cl.
*B62D 25/20* (2006.01)
(52) U.S. Cl. .................................. 296/184.1
(58) Field of Classification Search ............ 296/43, 296/100.03, 100.04, 101, 104, 105, 184.1; 135/88.01; 410/102, 104, 106, 110, 112, 410/113, 116, 8, 105
See application file for complete search history.

(56) References Cited

U.S. PATENT DOCUMENTS

| | | | |
|---|---|---|---|
| 2,688,289 A | 9/1954 | Sterling | |
| 4,342,480 A | 8/1982 | Ross | |
| 4,382,736 A | 5/1983 | Thomas | |
| 4,969,784 A | 11/1990 | Yanke | |
| 5,259,711 A | 11/1993 | Beck | |
| 5,338,084 A | 8/1994 | Wardell | |
| 5,454,612 A | 10/1995 | Christensen | |
| 6,024,402 A | 2/2000 | Wheatley | |
| 6,067,925 A * | 5/2000 | Little | 114/354 |
| 6,250,861 B1 | 6/2001 | Whitehead | |
| 6,446,569 B1 * | 9/2002 | Pitts | 114/344 |
| 6,585,465 B1 | 7/2003 | Hammond et al. | |
| 6,641,353 B2 | 11/2003 | Oliver | |
| 6,712,568 B2 | 3/2004 | Snyder et al. | |

\* cited by examiner

*Primary Examiner*—Lori L Lyjak
(74) *Attorney, Agent, or Firm*—Brunet & Co.; Robert A. H. Brunet

(57) ABSTRACT

A removable truck deck for use as part of a roll-off truck deck system. In one embodiment, the removable truck deck comprises a replaceable and interchangeable side fitting that may be locked at a desired position along the length of the removable truck deck. The side fitting may be used to provide a plurality of interchangeable attachments on the truck deck. One such attachment may include a pontoon permitting the truck deck to float when removed from the truck. A plurality of floating truck decks in abutting longitudinal series may be used to create a floating bridge. Other attachments include, wheels, cranes, winches, transverse partitions, tailgates, sidewalls, etc.

20 Claims, 9 Drawing Sheets

REMOVABLE TRUCK DECK

FIELD OF THE INVENTION

The invention relates to removable truck decks. More particularly, the invention relates to a removable truck deck for use as part of a roll-off truck deck system having a number of available side fittings permitting a number of configurations.

BACKGROUND

Roll-off truck deck systems are advantageous in that they permit a number of purpose-built truck decks to be readily interchanged on a suitably equipped truck or military vehicle, such as a Humvee. This allows a single truck to be used for a number of different applications and also allows decks to be left at a desired location for use separately from the truck. Examples of purpose-built deck configurations include: flat decks, cube decks, dump boxes, welding decks, portable washrooms, jobsite offices, equipment storage lockers, etc. Roll-off truck systems and further examples of suitable decks for use therewith are described in U.S. Pat. No. 6,641,353, which is incorporated herein by reference.

Since the advantage provided by a roll-off truck deck system is in making a single truck adaptable to a number of different applications, it would be further advantageous to make the decks themselves adaptable by providing a number of replaceable and interchangeable attachments that allow the deck to be used in different ways. It would be further advantageous to provide these attachments in a manner that allows their position of the truck deck to be adjustable so as not to be limited by the location of the attachment on the truck deck.

Winches or eyelets are sometimes used to receive straps for securing a load to a flatbed truck or trailer. The truck or trailer is often provided with a channel located beneath the deck that allows the winch or eyelet position to be adjusted along the length of the trailer. The winch or eyelet is not usually secured at a desired position, but instead friction between the strap and the upper surface of the truck deck is relied upon to hold the winch in position. An example of such a system is provided in U.S. Pat. No. 4,382,736. In trailer applications, it is desirable to provide the rail beneath the deck so as to provide as much load-bearing deck width as possible without the trailer exceeding the maximum allowable road width. However, purpose-built removable truck decks do not approach the maximum allowable road width and therefore are not faced with this same limitation. Furthermore, providing a channel beneath the deck would potentially interfere with loading and unloading of the removable truck deck. For this reason, these prior art systems are not suitable for use in removable truck deck applications.

Side-channel systems for trailers are also known, and some of these systems do include replaceable and interchangeable fittings for a variety of different purposes. Examples of such systems are provided in U.S. Pat. No. 4,342,480, U.S. Pat. No. 5,338,084 and U.S. Pat. No. 6,250,861. These systems typically suffer from structural strength limitations, primarily due to the manner in which they are locked in position. In addition, most of these systems have only been previously employed on trailers, not trucks. To the extent such systems have been employed on trucks, they are located on an interior side wall of a cargo space, such as within the box of a pickup truck (see, for example, U.S. Pat. No. 4,969,784 and U.S. Pat. No. 6,585,465) or within an aircraft (see U.S. Pat. No. 2,688,289). This interior application is not analogous to the exterior of a removable truck deck and such systems would be difficult to keep clean of road debris or ice if mounted on the exterior of a vehicle.

In another known system, channels are provided in a top surface of a side wall of a pickup truck box. Examples of such systems are provided in U.S. Pat. No. 5,259,711, U.S. Pat. No. 5,454,612, U.S. Pat. No. 6,024,402 and U.S. Pat. No. 6,712,568. Removable truck decks generally do not have fixed side walls and, if such a system were provided in a top surface of a truck deck, it would take up a substantial portion of the load bearing surface of the truck deck. Mounted the rails on the top surface of the truck deck would also make the rails susceptible to debris contamination and damage by loading of cargo on and off of the deck. Such a system is therefore not suitable for use on a removable truck deck.

The need therefore remains for improved removable truck decks having adjustable and interchangeable side fittings allowing a single deck to be used in a variety of applications.

One application of roll-off truck deck systems is in transporting cargo. When transporting cargo across a body of water, the cargo is typically unloaded from the truck deck and then loaded on to a boat. It would be desirable to have a purpose-built truck deck that obviated the need for this unloading/loading step, for example by allowing the deck to float when removed from the truck. Floating truck decks that are compatible for use with roll-off truck deck systems for ease of removal are currently unavailable and therefore the need for these types of truck decks still remains. It would be desirable to utilize adjustable and interchangeable side fittings in creating such a floating truck deck.

Floating bridges are used to transport equipment across bodies of water, particularly in situations where it is desirable to erect the bridge quickly and temporarily. It would be desirable to provide a plurality of purpose-built removable truck decks for use in quickly erecting a floating bridge. However, no such removable truck decks currently exist, particularly for use with a roll-off truck deck system for ease of loading and un-loading. The need therefore still remains for a removable truck deck for use in floating bridge applications. It would be desirable to utilize a floating removable truck deck in these floating bridge applications.

SUMMARY OF THE INVENTION

According to an aspect of the present invention, there is provided a removable truck deck having means for slidably positioning a fitting at a plurality of discrete locations along a length thereof, the removable truck deck comprising: a deck frame having opposed longitudinal sides and a planar surface; a central channel mounted to the frame beneath the deck surface and extending along a length thereof, the central channel for receiving a pair of longitudinal frame members of a truck when the removable truck deck is mounted on the truck; a side rail mounted on each of the opposed sides outwardly of the deck frame, each side rail having a hollow cross-section and an outwardly oriented central slot extending a length thereof; a plurality of longitudinally spaced-apart holes on each side rail; at least one removable fitting in each side rail, each fitting having a base slidably received within the hollow cross-section of its respective rail and having an outwardly projecting portion extending through the central slot; a pin on each fitting for engagement with the holes; and, wherein the pin engages with one of the holes to secure the fitting at a selected position along the length of the rail.

The side rails may have a top surface aligned with a top surface of the deck frame and/or may have a bottom surface located above a bottom surface of the central channel. This advantageously prevents the side rails from engaging the ground when the removable truck deck is un-loaded from the truck. When viewed in transverse cross-section, each side rail may have a substantially C-shaped cross-section and the portions of the C-shape adjacent the slot may be outwardly flared or bent to prevent binding of the fitting within the side rail and to facilitate cleaning of the side rail.

The base may be of any suitable shape, for example square or rectangular. The base may include a means to facilitate sliding of the base along the side rail, for example one or more dry lubricant pads made from a material such as Delrin™, Teflon™, or similar materials.

The locking pin may be resiliently biased towards the side rail using a co-axial spring and may be selectively un-locked to permit movement of the fitting along the side rail. The pin may be mounted to the fitting longitudinally adjacent the base to allow the base to be made from suitable materials and of suitable thickness to support the desired load applied to the fitting. The plurality of holes may be round, oval, or any suitable shape. The holes may be provided within the side rail on an interior surface thereof. The holes may be laterally aligned with the central slot to facilitate passage of the pin into the interior of the side rail.

The outwardly projecting portion of the fitting may comprise an eye, winch or similar device for receiving a load securing tension member, for example a rope, cable, chain or strap. Alternatively, the outwardly projecting portion may comprise a vertically oriented post receiving member. The post receiving member may have any suitable horizontal cross-sectional shape and may have a square, rectangular, circular or oval shape. Preferably, the post receiving member has a substantially square horizontal cross-sectional shape. The post receiving member may have an open top and/or an open bottom. The bottom of the post receiving member may have a closed portion against which the bottom of a post may be abutted to prevent the post from passing completely through the post receiving member. The post receiving member may be hinged to permit pivoting from a vertical orientation to a horizontal orientation and may pivot beyond the horizontal to an inverted vertical orientation. One or more apertures may be provided on the post receiving member for receiving a post securing pin that is used to lock the post within the post receiving member. The post securing pin may be spring loaded and/or may include means to prevent inadvertent removal of the post securing pin from the aperture(s).

A number of different attachments may be provided and removably secured to the removable truck deck, for example by insertion within the post receiving member. Examples of suitable attachments include a post, a hoop, a jack, a crane, a winch, a wheel, a caster wheel, a side wall, a transverse partition, a tailgate, a ramp, a toolbox, a pontoon, a reinforcing structure, etc.

According to another aspect of the invention, there is provided a floating removable truck deck comprising: a deck frame having opposed longitudinal sides and a planar surface; a central channel mounted to the frame beneath the deck surface and extending along a length thereof, the central channel for receiving a pair of longitudinal frame members of a truck when the removable truck deck is mounted on the truck; and, at least a pair of pontoons, each pontoon removably attachable to the truck deck when the deck is removed from the truck.

The pair of pontoons may be transported in an upright position when the truck deck is attached to the truck and then inverted so that the flotation portion of each pontoon is below the truck deck when the truck deck is removed from the truck. The pontoons may be attached to the truck deck using one, two, three or more vertical posts attached thereto and inserted within a complementary member, such as the post receiving member of a side fitting as previously described. The pontoons may be provided either parallel to the length of the truck deck or oriented transversely thereto. The transverse orientation advantageously allows a plurality of pontoons to be provided, allowing the removable truck deck to support more weight when floating.

According to yet another aspect of the invention, there is provided a bridge made from a plurality of floating removable truck decks, the bridge comprising: at least two floating removable truck decks, each comprising: a deck frame having opposed longitudinal sides and a planar surface; a central channel mounted to the frame beneath the deck surface and extending along a length thereof, the central channel for receiving a pair of longitudinal frame members of a truck when the removable truck deck is mounted on the truck; at least a pair of pontoons, each pontoon removably attached to the truck deck; and, means for attaching two or more truck decks in abutting longitudinal series.

The means for attaching two or more truck decks in abutting longitudinal series may comprise a link bar that may be partially inserted within the side rail of a first removable truck deck with the remainder extending into the aligned side rail of an abutting second removable truck deck. The link bar may then be secured to both the first and second truck decks, for example using a link bar locking pin inserted through the link bar and into one of the holes on the side rail. The means may include, optionally or additionally, a longitudinally extending pin located at one end of the first removable truck deck. The longitudinally extending pin may be used to align the two abutting truck decks by engagement of the pin within a complementary pin receiving aperture located at an opposite end of the second truck deck. Each truck deck would therefore have a longitudinally extending pin at one end and a complementary aperture at its opposite end to permit a plurality of truck decks to be connected to one another in abutting longitudinal series. Any number of pins may be provided and a corresponding number of apertures may be provided. The aperture(s) may have a chamfered edge to facilitate engagement of the pin within the aperture(s). An engagement mechanism may be used to secure the pins within the apertures and/or to facilitate guiding of the pins into the apertures. The engagement mechanism may comprise a magnet.

The present invention advantageously provides removable and interchangeable side fittings to allow a single removable truck deck to be adapted to a variety of purposes. This enhances the functionality of the removable truck deck as part of a roll-off truck deck system designed to allow a single truck to be used in a number of different applications. The floating removable truck deck, in particular, is advantageous in transporting cargo across bodies of water while obviating the need for un-loading the cargo then re-loading it on to a boat. The floating truck deck is also advantageous when used as part of a floating bridge system.

BRIEF DESCRIPTION OF THE DRAWINGS

Having summarized the invention, preferred embodiments thereof will now be described with reference to the following figures, in which.

DETAILED DESCRIPTION

Throughout the description, like features will be referred to using like indicia. Accordingly, features marked by indicia on a particular drawing need not necessarily be described with reference to that drawing, but are described elsewhere in relation to another drawing. Similarly, indicia described with reference to a particular drawing need not necessarily be shown in association with that drawing but may be understood to relate to features shown in other drawings.

Figure 1:
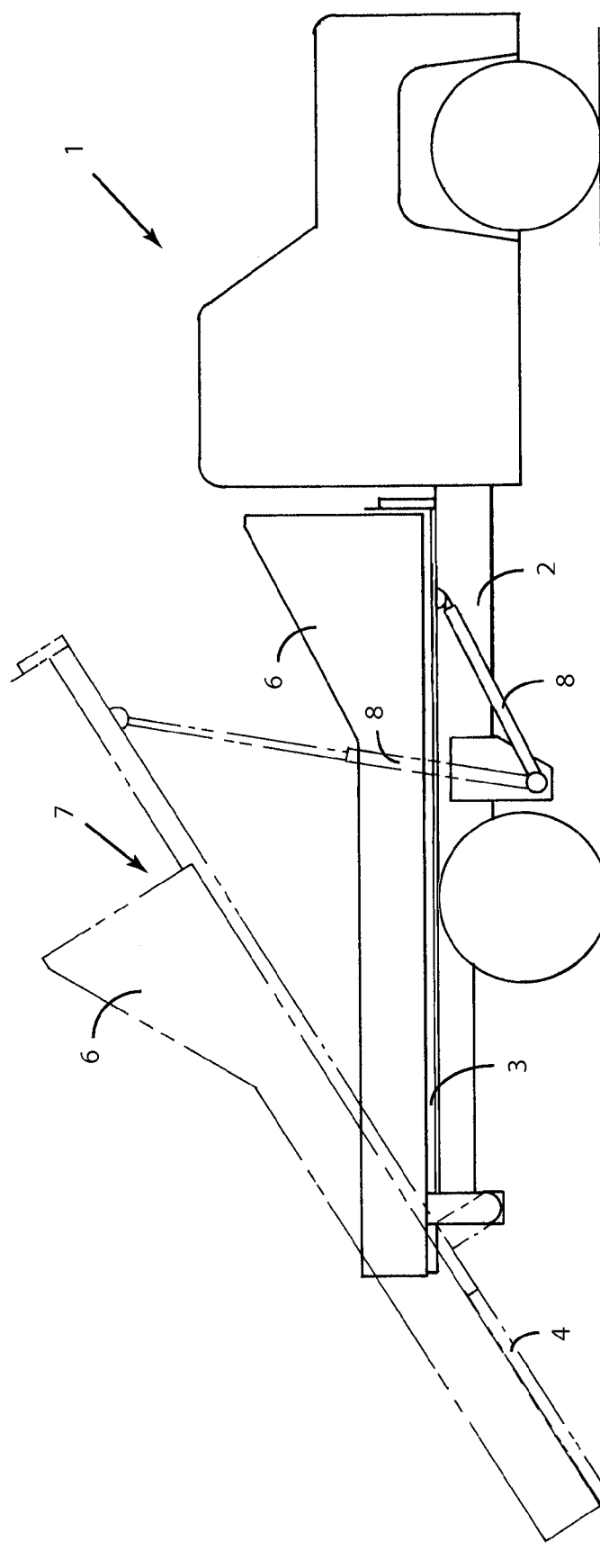
FIG. 1 is a side view of a prior art roll-off truck deck system having a removable truck deck.

Referring to FIG. 1, a prior art roll-off truck deck system comprises a truck 1 having a chassis 2 to which is attached a pivoting frame 3 that includes extendible and retractable frame extensions 4. A winch is provided, either on the chassis 2 or on the frame 3, which is attached to a removable truck deck 6 by means of a hooked cable. The removable truck deck 6 includes a central channel 7 located beneath the truck deck that is designed to receive and slide along the frame 3 and frame extensions 4. To remove the removable truck deck 6, the frame is pivoted upwardly about a rear pivot on the chassis 2 through extension of hydraulic cylinders 8 provided between the chassis 2 and the frame 3. The frame extensions 4 are extended so that when the frame 3 reaches its ultimate inclined position the frame extensions 4 engage the ground. The winch is then operated in a manner allowing the cable to extend, thereby permitting the removable truck deck 6 to slide downwardly along the frame 3 and the frame extensions 4. When the rearward end of the removable truck deck 6 reaches the ground, the truck 1 may be either driven forward or allowed to roll forward through the declining action of the removable truck deck. The lower or bottom surface of the central channel 7 rests against the ground once the removable truck deck 6 has been fully removed from the truck. The hooked cable may then be disconnected from the removable truck deck 6 and retracted, the frame 3 may be lowered, and the frame extensions 4 retracted so that the truck is in its original configuration and ready to travel to its next destination. In this manner, purpose-built removable truck decks may be left at a desired location, such as a jobsite, and the truck may then be used to retrieve other decks, potentially for other purposes. This roll-off truck deck system advantageously allows a single truck to be used in a variety of applications and is more fully described in the previously cited U.S. Pat. No. 6,641,353.

Figure 2:
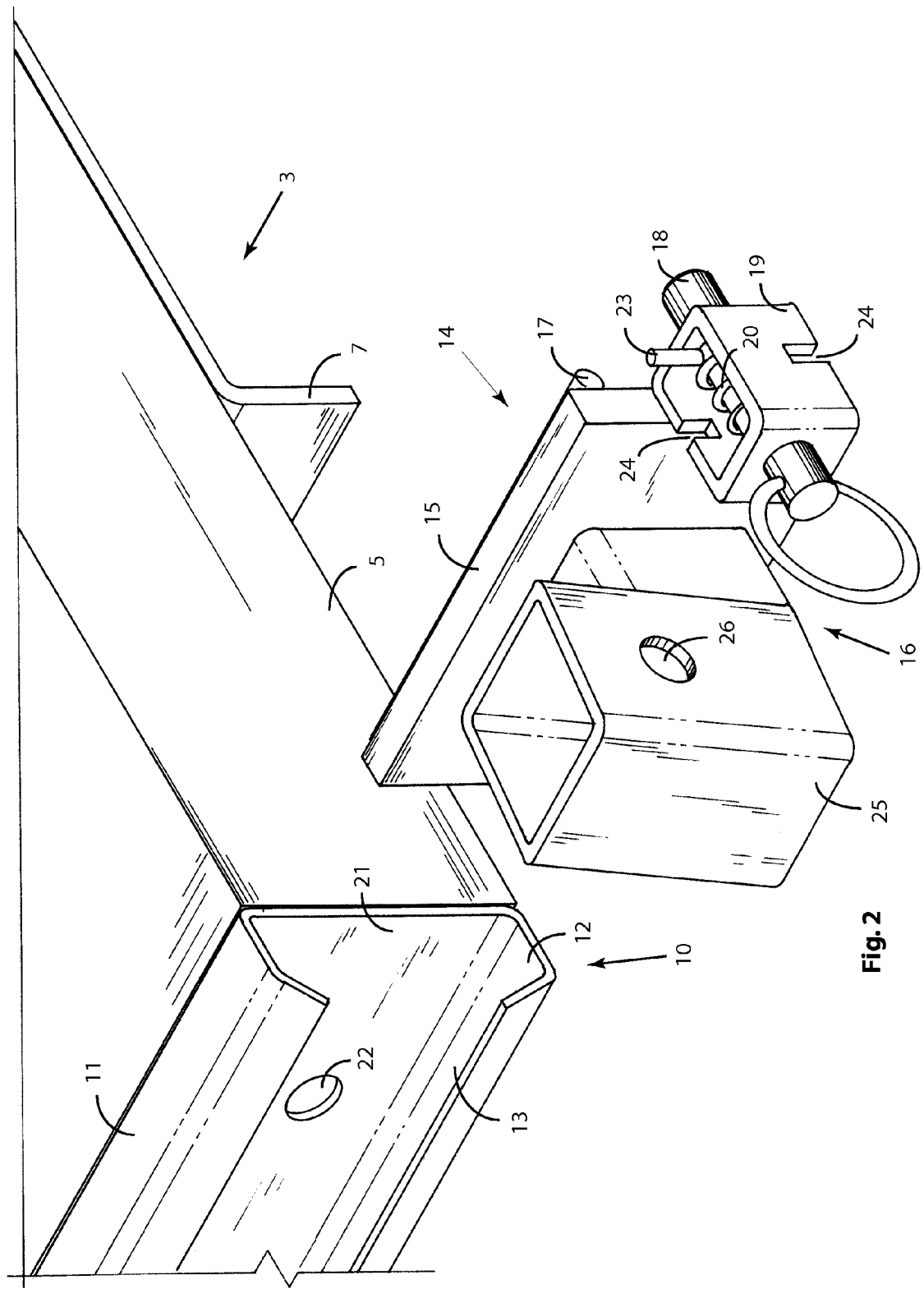
FIG. 2 is a perspective view of a side rail and fitting according to an embodiment of the present invention.
Figure 3:
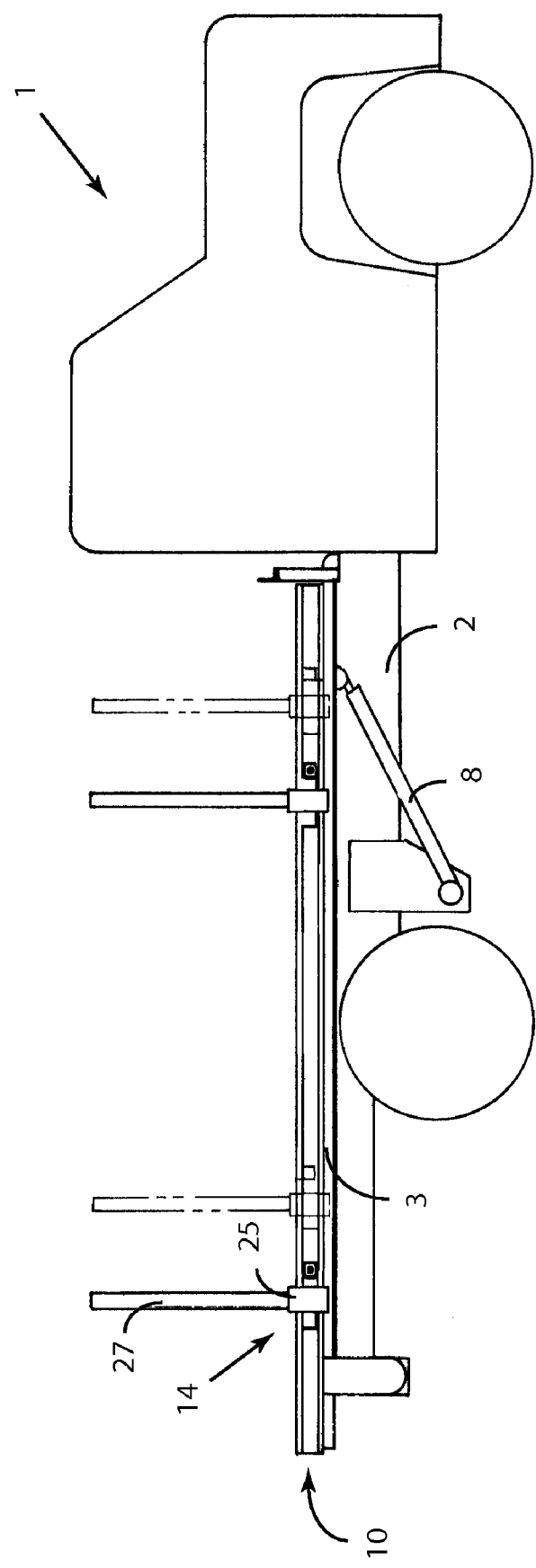
FIG. 3 is a side view of a truck having a removable truck deck with adjustable side fittings according to the present invention.

Referring to FIGS. 2 and 3, particularly FIG. 2, each removable truck deck 3 includes a deck frame 5 having a longitudinal side rail 10 along each opposed side thereof outwardly of the deck frame. Although the deck 3 shown in FIG. 2 is a flat deck having a deck frame 5 virtually indistinguishable from the deck itself, the deck might also include a superstructure having purpose-built features for a desired application. The side rail 10 has a top surface 11 that is aligned with a top surface of the deck frame 5. In addition, a bottom surface 12 of the side rail 10 is located above a bottom surface of the central channel(s) 7 in order to keep the side rail spaced apart from the ground when the deck 3 is removed from the truck. This keeps the side rail 10 free of contamination by dirt, etc. and allows removal and/or re-positioning of fittings along the side rail without ground interference. The bottom surface may include a plurality of drainage openings (not shown) to prevent the accumulation of debris, ice, etc. and to facilitate cleaning of the interior of the side rail, for example by a high pressure water jet. The side rail 10 is hollow with a substantially C-shaped cross section and has a central longitudinal slot 13 along an outward side thereof. The portions of the C-shaped cross section adjacent the slot 13 are bent outwardly to facilitate non-binding sliding movement of a removable fitting 14 longitudinally along the hollow cross section of the side rail 10. Each fitting 14 comprises a base 15 with an outwardly projecting portion 16 mounted thereto in a position that allows it to extend through the slot 13 when the base is mounted within the side rail 10. The base is substantially rectangular in shape and includes a pair of upper and lower strips 17 that allow the base to fit snugly within the hollow C-shaped cross section of the side rail 10 while at the same time permit ready movement of the base along the side rail. The strips 17 may be made from a wear resistant material and may include a dry lubricant material. The strips 17 may also be made from a composite of two or more materials. Examples of suitable materials include metals and certain plastics, preferably wear resistant dry lubricant plastics such as Delrin™, UHMW polyethylene or Teflon™.

Each fitting 14 has a pin 18 mounted to the fitting adjacent the base 15. The pin is resiliently mounted within a casement 19 by means of a co-axial coil spring 20 that is captivated within the casement. The spring 20 biases the pin 18 towards an interior surface 21 of the side rail 10. A plurality of holes 22 are provided at spaced apart intervals along the length of the interior surface 21 and are sized to correspond with the diameter of the pin 18. Engagement of the pin 18 within a chosen hole 22 locks the fitting 14 at a desired longitudinal position along the length of the side rail 10. The pin includes a radially extending dog 23 that may be locked within a complementary slot 24 in the casement 19 by rotation of the pin 18 after withdrawal from the hole 22. This permits the position of the fitting 14 to be readily adjusted by sliding the base 15 along the side rail 10, as illustrated in FIG. 3. By locating the pin 18 within the casement 19 adjacent the base 15, a stronger locking mechanism can be made than if the pin 18 were simply mounted directly to the base. The strength of the locking mechanism allows the fitting 14 to be securely held in a desired longitudinal position against the significant loads that are sometimes applied in certain applications, especially when the deck 3 is removed from the truck 1.

The outwardly projecting portion 16 may comprise a variety of purpose-built ends. For example, as illustrated in FIG. 2, the outwardly projecting portion 16 may comprise a vertically oriented post receiving member 25. The post receiving member 25 has a hollow, substantially square cross-section with an open top end and either an open, closed or partially closed bottom end. A vertical post 27 (not shown in FIG. 2) having a complementary cross-sectional shape to the post receiving member 25 may be inserted through the open top and optionally abutted against the closed or partially closed bottom. A pair of aligned apertures 26 is provided in both the post receiving member 25 and the vertical post 27 for receiving a post locking pin (not shown) therethrough to secure the vertical post within the post receiving member. It should be noted that, as shown in FIG. 2, the top end of the post receiving member 25 is angled slightly inwardly towards the truck deck 3 by an angle of about 5 degrees. The vertical post 27 is therefore not perfectly vertical when inserted within the post receiving member 25 but may be understood to be substantially vertical within the context of this invention. The inward angle of the post receiving member 25 is intentionally provided to compensate for the slightly oversized nature of its hollow interior as compared with the exterior dimensions of the vertical post 27. The inclination of the post receiving member 25 causes the posts 27 to all incline towards the truck deck 3 rather than be randomly inwardly or outwardly inclined, simplifying alignment of removable sidewalls or other devices along the posts. Furthermore, the inward angle of the posts is useful when a transverse partition is employed, as will be more thoroughly described hereinafter. The transverse partition pushes out against the inwardly inclined posts 27 on opposite sides of the truck deck 3 and wedges them against both the lower inner and upper outer edges of the post receiving member 25. This locks the transverse partition in place and reduces its tendency to rattle during transport. The inward angle of the post receiving member 25 is therefore a function of both the amount by which its interior dimensions are oversized relative to the post 27 to be inserted and the overall height of the post receiving member itself.

Figure 4:
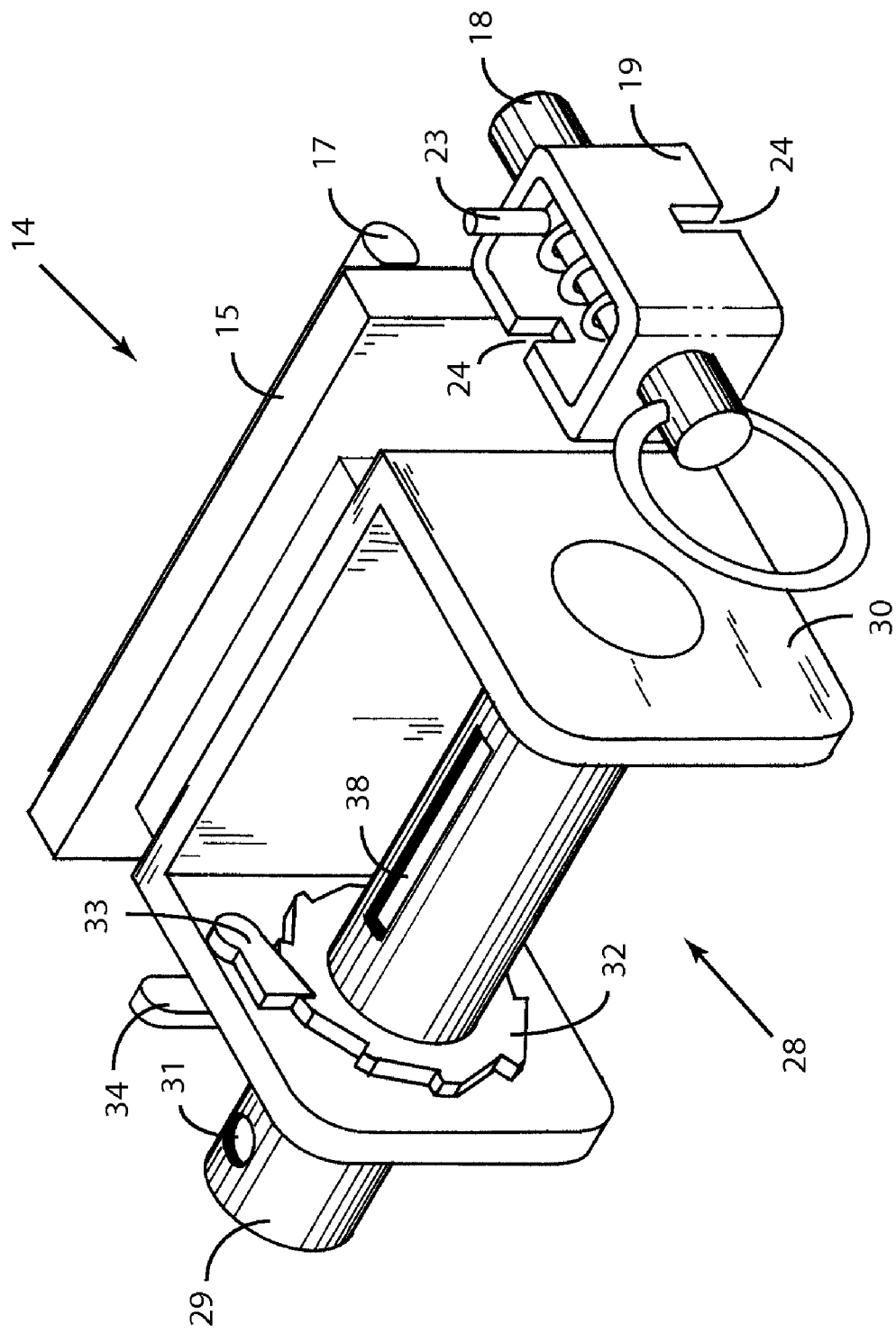
FIG. 4 is a perspective view of a side fitting comprising a winch.

Referring to FIG. 4, another purpose-built end for the outwardly projecting portion 16 is shown. In this embodiment of the fitting 14, the outwardly projecting portion 16 comprises a winch 28. The winch 28 is mounted directly to the base 16 and comprises a shaft 29 rotatably mounted within a winch housing 30. The shaft 29 includes a longitudinal slot 38 through which the free end of a load-engaging strap may be inserted and then doubled over itself. A crank member (not shown) is inserted within the hole 31 outward of the housing 30 to apply rotational leverage to the shaft 29 in a counter-clockwise direction when tightening the strap. A gear 32 co-axial with the shaft and having a plurality of angled teeth is provided for locking engagement with a spring-loaded pawl 33 in order to prevent rotation of the shaft in the clockwise direction, thereby holding the strap taut against the load and permitting the crank member to be re-positioned in order to apply additional leverage. A release catch 34 may be activated to disengage the pawl 33 from the gear 32 and permit loosening of the strap by reverse rotation of the shaft 29. The locking pin 18 mounted adjacent the base 15 is used to position the fitting 14 at a desired longitudinal position along the length of the truck deck 3, as previously described in relation to FIG. 2. This permits the winch 28 to be located wherever the load-engaging strap is needed, rather than being located at a fixed position as is common in the prior art. A strong locking mechanism is needed to ensure that the winch 28 remains secured and that the load does not come free from the deck 3. As previously described, the mounting of the pin 18 adjacent the base 15 allows a stronger locking mechanism to be provided than if the pin were mounted directly within the base itself.

Figure 5:
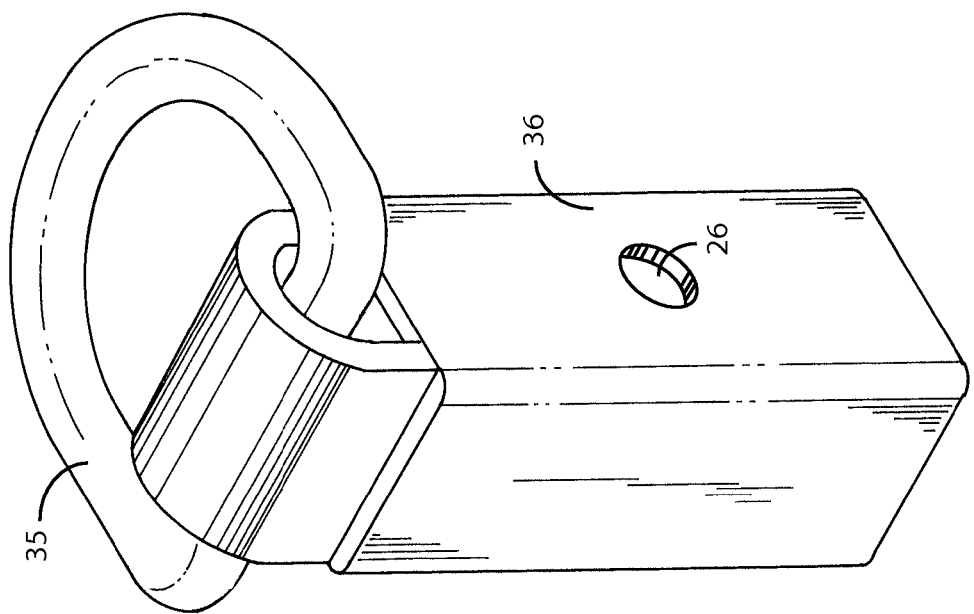
FIG. 5 is a perspective view of a vertical post comprising an eyelet for mounting within a post receiving member of a side fitting according to the present invention.

Referring to FIG. 5, another purpose-built end for the outwardly projecting portion 16 is provided in the form of an eye 35 for receiving the free end of a rope, chain, strap, cord or similar load-engaging tension element. The eye 35 is mounted to a post stub 36 for insertion within a complementary post receiving member 25 as previously described. The post stub 36 includes a pair of aligned apertures 26 for receiving a post locking pin to secure the post stub within the post receiving member 25, also as previously described. In a like manner, any number of purpose-built ends be created and readily interchanged with a single fitting 14 having a post receiving member 25 as part of the outwardly projecting portion 16.

Figure 6:
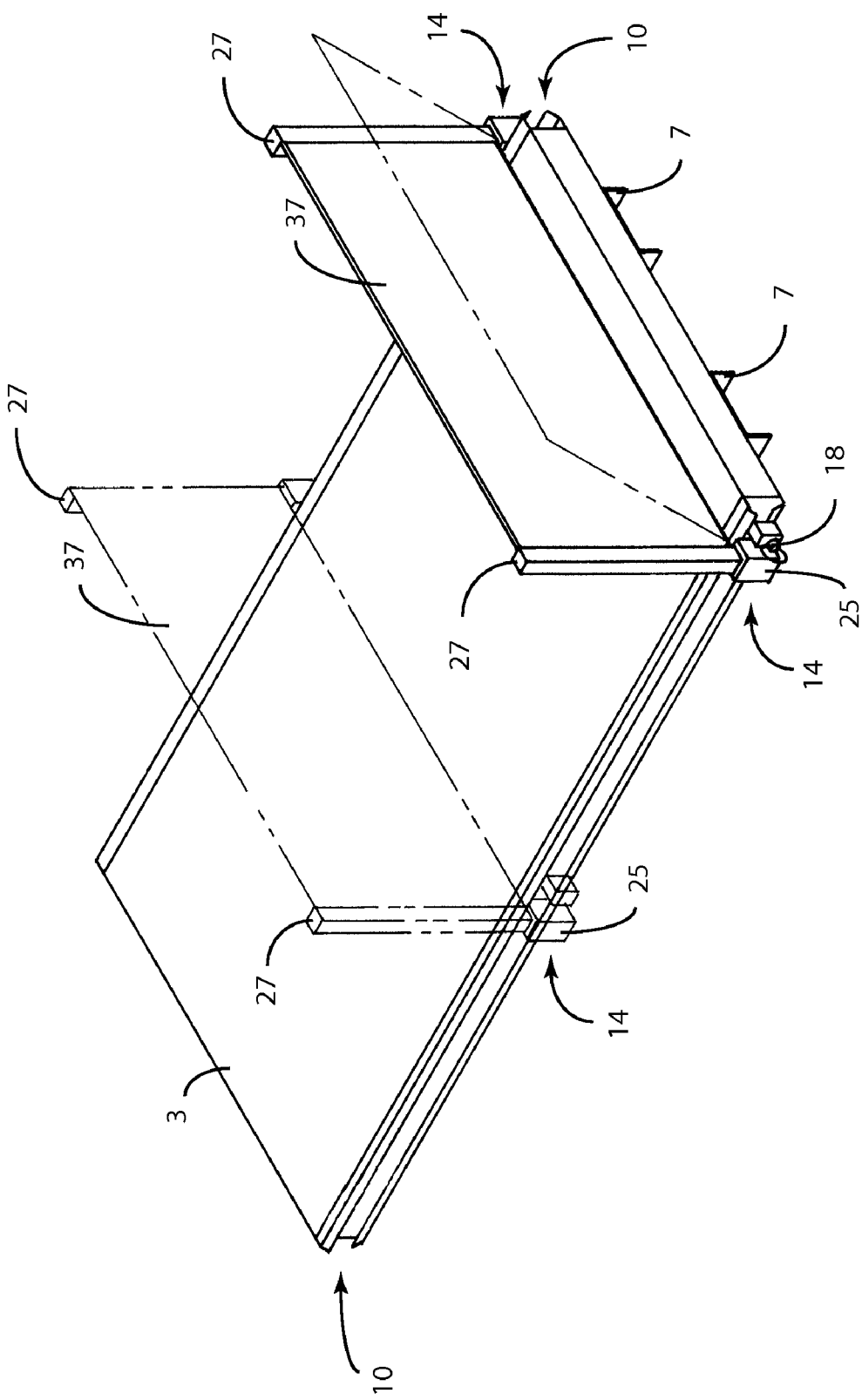
FIG. 6 is a perspective view of a removable truck deck having adjustable side fittings for attachment to a hinged transverse partition.

Referring to FIG. 6, a removable truck deck 3 is shown having an adjustable fitting 14 mounted within each side rail 10. Each fitting 14 has an outwardly projecting portion 16 comprising a post receiving member 25 and is locked at a selected longitudinal position by engagement of pin 18 within one of the plurality of holes 22. A vertical post 27 is inserted within each post receiving member 25. A transverse partition 37 is provided between the posts 27. The transverse partition 37 may be located at any desired position along the length of the truck deck 3 and its position may be readily adjusted. This allows the load bearing surface of the truck deck 3 to be sub-divided into smaller area, such as may be useful in keeping different types of cargo separated. The transverse partition 37 may also include a hinge means (the location and features of which may be inferred with reference to the drawing) permitting downward folding of the partition away from the posts 27. This allows the partition 37 to function as a tailgate that may be opened and closed to load and unload cargo from the truck deck 3. A plurality of transverse partitions 37 may be provided with a single truck deck 3 and may be provided in conjunction with side partitions (not shown) formed in a similar manner using a pair of posts 27 within the same side rail 10. This side and transverse partition system can be used to create a plurality of load compartments on a single truck deck 3 for carrying a combination of loose loads (for example, top soil, wood chips and gravel), while still permitting the truck deck 3 to be re-configured to change the relative size of the load compartments or eliminate the load compartments altogether. This system is of particular utility in landscaping applications.

Figure 7:
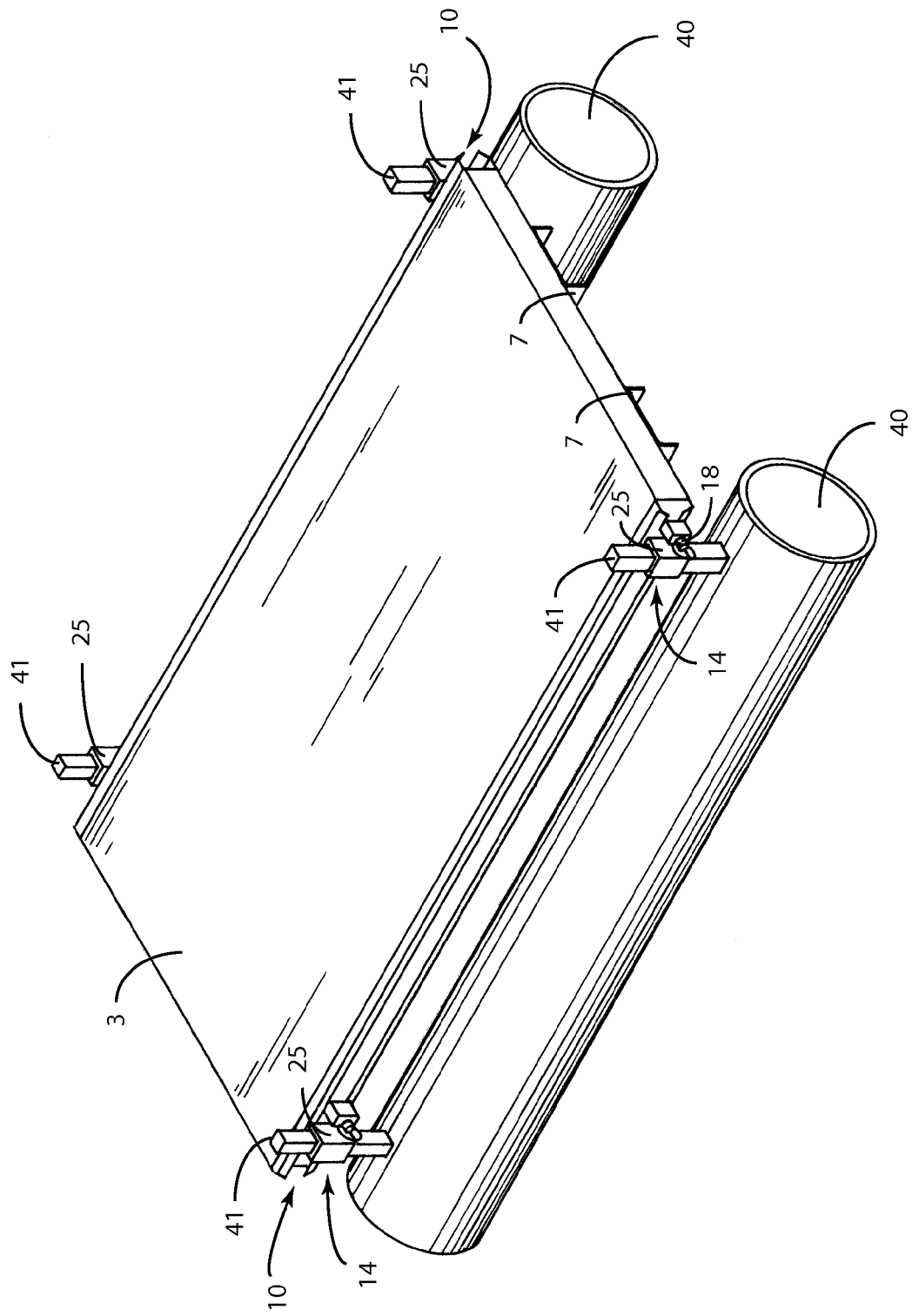
FIG. 7 is a perspective view of a floating removable truck deck having adjustable side fittings for attachment to pontoons.

Referring now to FIG. 7, a removable truck deck 3 is illustrated having a pair of adjustable fittings 14 on each side thereof to which a pontoon 40 is removably mounted. Each pontoon has two pontoon posts 41 attached thereto for removable insertion through the open bottom end of each post receiving member 25. The post locking pin (not shown) is used to retain each pontoon post 41 within its post receiving member 25. By locating the pontoons 40 beneath the truck deck 3, the truck deck is permitted to float and can act as a barge to permit cargo to be transported across a body of water without first requiring that it be unloaded from the truck deck 3. The posts may be transported outwardly of the truck deck 3 while on the truck by downward insertion of the pontoon posts 41 into the open top end of the post receiving member 25, then inverted just prior to removing the truck deck 3 from the truck deck. To facilitate this, the pontoon posts 41 may be transversely offset from the centreline of the pontoon 40. The post receiving members 25 may be hinged in a manner allowing the pontoons 40 to pivot from an upright position to an inverted position, thereby obviating the need for removing the pontoon posts 41 from the post receiving members and re-inserting them in the inverted position. Instead of a single long pontoon 40 along each side of the truck deck 3, as illustrated in FIG. 4, two or more shorter pontoons may be provided, each having two or more pontoon posts 41 for insertion within a complementary number of post receiving members 25. The pontoons 40 may be sized according to the desired load to be carried on the truck deck 3 and both the pontoons and truck deck may be made from lightweight materials such as aluminium or reinforced plastics. The pontoons 40 may be oriented either longitudinally or transversely oriented relative to the truck deck 3.

Figure 8:
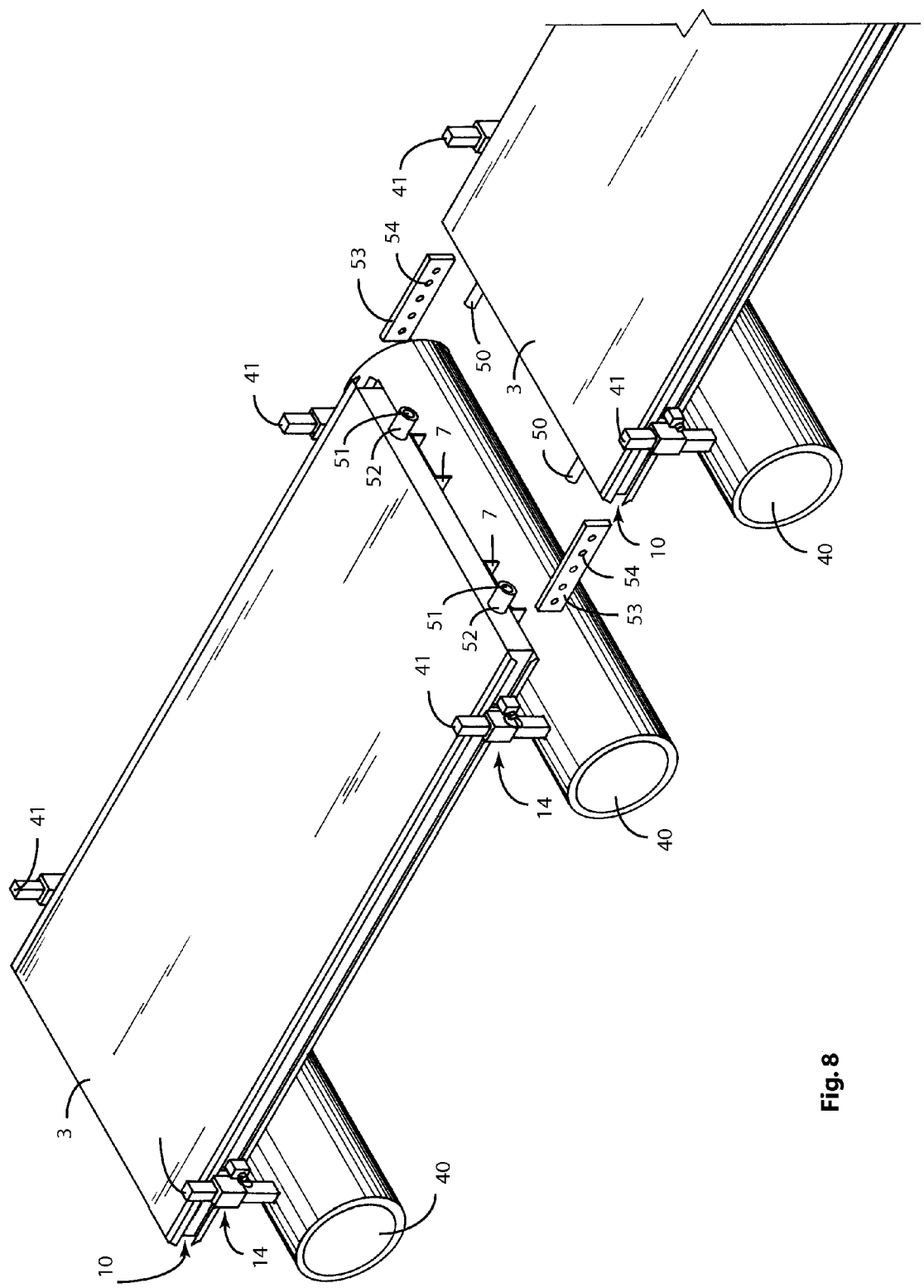
FIG. 8 is a perspective view of a plurality of floating removable truck decks connected to one another in abutting longitudinal series to form a floating bridge; and, FIG. 9 is a perspective view of a removable truck deck having adjustable side fittings for attachment to wheels.

Referring to FIG. 8, two removable truck decks 3 are shown, each having a pair of transversely oriented pontoons 40 attached thereto in a manner permitting both decks to float. Any number of transversely aligned pontoons 40 may be provided according to the load bearing requirements. The floating truck decks 3 may be abutted in longitudinal series and attached to one another in order to form a floating bridge. Each deck 3 has at one end a pair of longitudinally extending alignment pins 50 and at an opposite end a pair of complementary pin receiving apertures 51. The pin receiving apertures may be either recessed within the deck frame 5 or housed within a cylindrical extension 52, as shown. The pin receiving apertures 51 may include a chamfered edge to aid in guiding the pins 50 into the apertures. The apertures 51 may be oversized relative to the pins 50 to facilitate alignment and to permit limited relative movement between the truck decks 3. Once the truck decks 3 are aligned, a link bar 53 located within each side rail of a first truck deck may be extended into the longitudinally aligned side rail of a second abutting truck deck. The link bar 53 comprises a plurality of spaced apart holes 54 which may be aligned with the holes 22 on the interior of the side rail 10 of each truck deck 3 and secured thereto by means of two pins (not shown), one pin inserted through the longitudinal slot 13 of each truck deck. A reinforcing superstructure or substructure (not shown), for example a truss-like side railing, may be provided along the length of each truck and may be used to optionally interconnect two or more truck decks. The reinforcing structure may include a plurality of vertical posts for insertion within post receiving members of a side fitting 14 in a manner as has been previously described. This provides additional rigidity to the truck deck, allowing more weight to be supported, and allows the truck decks to be optionally interconnected in a manner that limits flexion and rotational movement between truck decks. A plurality of tuck decks, pontoons, and reinforcing structures can be provided on one truck or a plurality of trucks to form the bridge. In this manner, a plurality of abutting truck decks may be readily connected to one another in longitudinal series to form a floating bridge having any desired length and any desired load bearing capacity.

Figure 9:
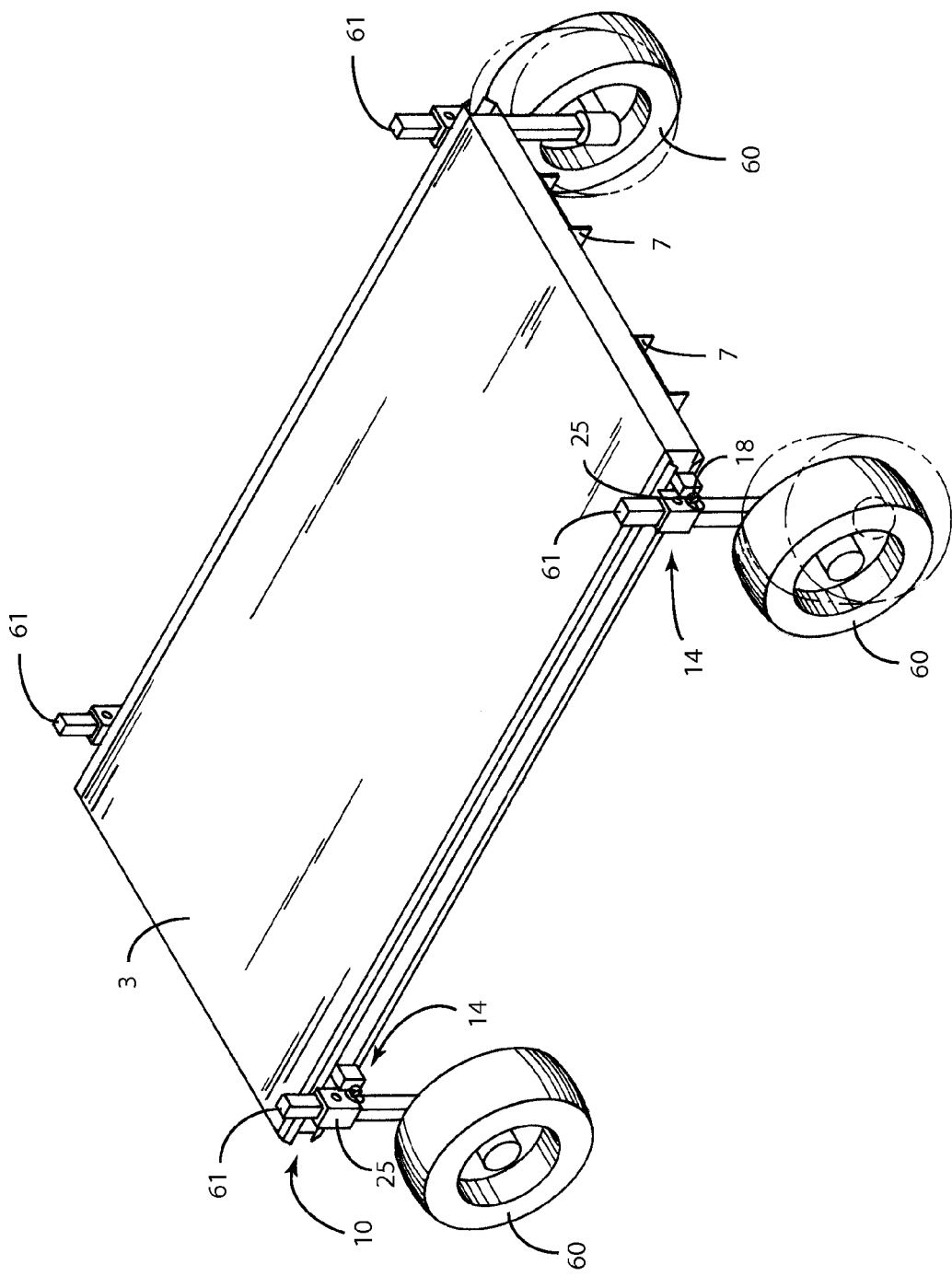

Referring to FIG. 9, a removable truck deck is shown having a number of wheels 60 attached thereto. Each wheel 60 includes a wheel post 61 that is removably inserted upwardly into its respective post receiving member 25. The wheel post 61 may have any required length and may be inserted to the extent required to provide the desired elevation between the upper surface of the truck deck 3 and the surface on which the wheels 60 are intended to roll. In the four-wheeled configuration shown in FIG. 6, at least two of the wheels 60 are allowed to caster, thereby permitting the truck deck 3 to be steered. The wheels 60 are particularly useful in moving a removable truck deck from location to location, for example within a factory or on a jobsite.

Any combination of fittings 14 may be provided with a removable truck deck according to the present invention to form desired structures or to facilitate desired uses. For example, side walls and transverse partitions may be formed on a deck with wheels to create a mobile storage container. Other configurations for the outwardly extending portion 16 may be provided that are not explicitly described herein but are intended to be encompassed within the ambit of the following claims. The invention is described throughout the specification with reference to a truck, and it should be noted that the term truck is meant to encompass all manner of truck-like vehicles, including multi-wheeled vehicles, tracked vehicles and military vehicles such as the Humvee. The foregoing describes preferred embodiments of the invention and other features and embodiments of the invention will be evident to persons skilled in the art. The following claims are to be construed broadly with reference to the foregoing and are intended by the inventor to include other variations and sub-combinations that are not explicitly claimed.

The invention claimed is:

1. A removable truck deck having means for slidably positioning a fitting at a plurality of discrete locations along a length thereof, the removable truck deck comprising:
   a) a deck frame having opposed longitudinal sides and a planar surface;
   b) a central channel mounted to the frame beneath the deck surface and extending along a length thereof, the central channel for receiving a pair of longitudinal frame members of a truck when the removable truck deck is mounted on the truck;
   c) a side rail mounted on each of the opposed sides outwardly of the deck frame, each side rail having a hollow cross-section and an outwardly oriented central slot extending a length thereof;
   d) a plurality of longitudinally spaced-apart holes on each side rail;
   e) at least one removable fitting in each side rail, each fitting having a base slidably received within the hollow cross-section of its respective rail and having an outwardly projecting portion extending through the central slot;
   f) a pin on each fitting for engagement with the holes; and,
   g) wherein the pin engages with one of the holes to secure the fitting at a selected position along the length of the rail.

2. The truck deck of claim 1, wherein each side rail has a top surface aligned with a top surface of the deck frame.

3. The truck deck of claim 1, wherein each side rail has a bottom surface located above a bottom surface of the central channel.

4. The truck deck of claim 1, wherein each side rail has a substantially C-shaped cross section.

5. The truck deck of claim 1, wherein the holes are within the side rail and laterally aligned with the central slot.

6. The truck deck of claim 1, wherein the pin is mounted to the fitting longitudinally adjacent the base.

7. The truck deck of claim 1, wherein the pin is resiliently biased towards the holes.

8. The truck deck of claim 1, wherein the outwardly projecting portion comprises a winch or an eye for receiving a rope, cable, chain or strap.

9. The truck deck of claim 1, wherein the outwardly projecting portion comprises a vertically oriented post receiving member.

10. The truck deck of claim 9, further comprising a pontoon having at least one pontoon post attached thereto for removable insertion within the post receiving member.

11. The truck deck of claim 10, wherein there are at least two fittings on each side of the truck deck, wherein there are at least two pontoons and wherein each pontoon has at least two pontoon posts, each post removably inserted upwardly into a respective post receiving member, the pontoons located below the truck deck and allowing the truck deck to float when removed from the truck.

12. The truck deck of claim 9, further comprising a wheel having a wheel post attached thereto for removable insertion within the post receiving member.

13. The truck deck of claim 12, wherein there are at least two fittings on each side of the truck deck, wherein there are four wheels and wherein the wheel post of each wheel is removably inserted upwardly into a respective post receiving member, the wheels located below the truck deck and allowing the truck deck to roll when removed from the truck.

14. The truck deck of claim 9, wherein there is at least one fitting on each side of the truck deck and wherein the truck deck further comprises a transverse partition having two ends, each end having a vertical post attached thereto, each post removably inserted downwardly into a respective post receiving member, the partition located above the truck deck at a desired location along the length thereof.

15. The truck deck of claim 14, wherein the partition comprises a lower hinge means permitting at least a portion of the partition to downwardly open.

16. The truck deck of claim 1, further comprising means for attaching two or more abutting truck decks in longitudinal series.

17. The truck deck of claim 16, wherein the means for attaching two or more abutting truck decks in longitudinal series comprises a link bar located within each side rail and extending longitudinally into an aligned side rail of an adjacent truck deck, each link bar secured to both the truck deck and the adjacent truck deck.

18. The truck deck of claim 16, wherein the means for attaching two or more abutting truck decks in longitudinal series comprises at least a longitudinally extending alignment pin located at one end of the truck deck and a complementary pin receiving aperture located at an opposite end of the truck deck.

19. A floating removable truck deck comprising:
a) a deck frame having opposed longitudinal sides and a planar surface;
b) a central channel mounted to the frame beneath the deck surface and extending along a length thereof, the central channel for receiving a pair of longitudinal frame members of a truck when the removable truck deck is mounted on the truck; and,
c) at least a pair of pontoons, each pontoon removably attachable to the truck deck when the deck is removed from the truck.

20. A bridge made from a plurality of floating removable truck decks, the bridge comprising:
a) at least two floating removable truck decks, each comprising:
  i. a deck frame having opposed longitudinal sides and a planar surface;
  ii. a central channel mounted to the frame beneath the deck surface and extending along a length thereof, the central channel for receiving a pair of longitudinal frame members of a truck when the removable truck deck is mounted on the truck;
  iii. at least a pair of pontoons, each pontoon removably attached to the truck deck; and,
b) means for attaching two or more truck decks in abutting longitudinal series.

* * * * *